United States Patent [19]

Flink et al.

[11] Patent Number: 4,480,393

[45] Date of Patent: Nov. 6, 1984

[54] VAPOR RECOVERY METHOD AND APPARATUS

[75] Inventors: Leslie R. Flink, New Brighton; Bryce J. Fox, Shoreview; Mary K. Witzel, Minneapolis, all of Minn.

[73] Assignee: Minnesota Mining and Manufacturing Company, St. Paul, Minn.

[21] Appl. No.: 273,962

[22] Filed: Jun. 15, 1981

[51] Int. Cl.³ .............................................. F26B 3/04
[52] U.S. Cl. ........................................ 34/27; 34/32; 34/77; 34/80; 55/62; 55/74
[58] Field of Search .................. 34/27, 32, 35, 86, 80, 34/77; 62/87, 93, 324 F, 238 A, 238 C; 55/62, 74, 208

[56] References Cited

U.S. PATENT DOCUMENTS

| | | | |
|---|---|---|---|
| 1,418,363 | 6/1922 | Coggeshall et al. | 34/80 |
| 2,494,644 | 1/1950 | Clement | 34/80 |
| 2,570,974 | 10/1951 | Neuhart | 34/77 |
| 3,064,358 | 11/1962 | Giuffre | 34/77 |
| 3,534,529 | 10/1970 | Mattia | 55/62 |
| 3,728,074 | 4/1973 | Victor | 34/80 |
| 4,150,494 | 4/1979 | Rothchild | 34/28 |
| 4,209,914 | 7/1980 | Gustafsson | 34/77 |
| 4,295,282 | 10/1981 | Fox | 34/77 |

FOREIGN PATENT DOCUMENTS 54-95978 7/1979 Japan .
1128578 9/1968 United Kingdom .
2019738 11/1979 United Kingdom .

OTHER PUBLICATIONS

"Brayton-Cycle Solvent Recovery System"-Report by Ai Research Manuf. Company of California to DO-E-Jun. 16, 1980.
"The Adsox Process With Inert Gas Desorption Technique, Odor Separation and Solvent Recovery"-*Fette-Seifen-Anstrichmittel*, 1981.
"Desorption of Solvents From Activated Coal By Inert Gases", Zhumal Prikladnoi Khimii, vol. XVIII, No. 9-10 (1946), pp. 97-101.
Package Sorption Device System Study, EPA Document PB 221-138, Apr. 1973, pp. 3-5 through 3-10.
Air Pollution Control Manual for Hydrocarbons and Condensable Gases, Vapor Recovery Eqt.-Edwards Engineering-no date.

*Primary Examiner*—Larry I. Schwartz
*Attorney, Agent, or Firm*—Cruzan Alexander; Donald M. Sell; Warren R. Bovee

[57] ABSTRACT

Vapor recovery system comprising vapor source, vapor concentrating system and refrigeration condensation system. Method comprises accumulating condensable vapor in vapor accumulator, and subsequently removing vapor from accumulator using carrier gas to provide concentrated carrier gas stream. Vapor in carrier gas is condensed by refrigeration condensation means.

25 Claims, 5 Drawing Figures

VAPOR RECOVERY METHOD AND APPARATUS

FIELD OF THE INVENTION

This invention relates to the recovery of condensable vapors from a vapor source by refrigeration condensation. More particularly, this invention relates to the use of a concentrating system, including an accumulating device and a noncondensable carrier gas stream circulated through the accumulating device, intermediate the vapor source and the condensing means in order to provide a higher vapor concentration for the condensing means. The condensable vapor is removed from the carrier gas by refrigerating at least a portion of the gas stream to cause condensation and separation of at least a portion of the condensable vapor.

A particularly useful application of the present invention relates to the recovery of solvent from a drying oven system.

PRIOR ART

Various techniques to remove solvent and other condensable vapors from process gas streams have been developed. One such technique involves the use of activated carbon beds to adsorb the solvent from a gas stream passed through the bed. Once the bed has adsorbed all of the solvent it can hold, the bed is desorbed using steam. In this desorption cycle, the steam is passed through the bed causing the bed to heat up and causing all but a residual amount of the solvent to vaporize and be carried out of the bed by the steam. The steam and solvent vapors are then cooled and condensed. Once the bed has been desorbed, the bed is cooled and dried and is ready for another adsorption cycle. The solvent can be separated from the condensed steam (water) using a variety of known separation techniques, e.g., distillation, phase separation etc., depending on the particular solvent(s) involved.

There are a number of disadvantages associated with steam desorption. Primary among these is the difficulty of separating the solvents, particularly water miscible solvents, from the condensed steam. Desorption with steam is also costly due to the amount of energy consumed to desorb and separate the solvent. For example, it can typically require 3,000 to 10,000 BTU's to desorb and recover one pound of solvent depending on the solvent and operating conditions. Thus, steam desorption can consume a significant amount of energy relative to the value of the solvent. Indeed, the cost of condensing and separating the solvent may in some instances equal or exceed the value of the solvent recovered. It is also expensive to treat the resulting waste water even following separation.

An alternate technique for desorbing carbon beds is by the use of an "inert" gas rather than steam. The bed is heated and inert gas is circulated through the heated bed to carry away the vapor in the bed. The use of inert gas allows the presence of relatively high vapor concentrations without forming explosive mixtures. When recovery of the vapor is desired the inert gas stream containing the vapor is cooled with water to condense and separate the liquid component.

The use of refrigeration condensation to recover solvent directly from a gas stream is known. See for example, copending U.S. patent application Ser. No. 960,774, filed Nov. 15, 1978, now Pat. No. 4,295,282 which discloses the use of an open cycle heat pump for solvent recovery. Refrigeration condensation encounters some difficulties when used with solvents having high vapor pressures (low boiling points) or when the solvent is present in the gas stream in low concentrations as is generally required in industrial environments for safety reasons. This is due to the low temperature, and accompanying frost problems, associated with solvent separation under such conditions. The use of closed cycle refrigeration systems for direct condensation of solvents is also known and is fraught with similar difficulties when working with such gas streams.

SUMMARY OF THE INVENTION

The present invention has overcome the difficulties associated with the various methods of direct vapor condensation and recovery known to the prior art. This has been accomplished in the present invention by employing refrigeration condensation in combination with a concentrating system between the vapor source and the condensation system. This allows the condensation system to operate on a vapor-containing gas stream having a higher concentration of vapor than in the vapor source, e.g., drying oven process gas stream, while avoiding the need to operate at the extremely low temperatures, with attendant frost problems, which would be required to directly condense such a vapor source.

The concentrating system of the present invention comprises an accumulating device, such as a carbon bed, which can temporarily hold vapor from a vapor source for subsequent release. The concentrating system also comprises carrier means, such as a noncondensable gas stream, which can be circulated through the accumulating device to carry the accumulated vapor to a condensing system in a concentration greater than the concentration in the vapor source. Thus, the vapor-containing gas presented to the condensing system can have a higher concentration of condensable vapor than was present in the vapor source. Moreover, such higher concentration is independent of the vapor concentration in the vapor source. In a typical case, the accumulating device will be a bed of activated carbon. The bed will be heated to desorb and release the accumulated vapor and to allow the carrier gas to remove the vapor from the bed.

Refrigeration condensation as used in the present invention refers to the cooling of a gas stream under substantially non-pressurized conditions, e.g., nominally 3 atmospheres or less, to temperatures below the normal cooling temperatures for water condensers, e.g., below about 50° F. Preferably the gas is cooled at some point in the condensation cycle to a temperature in the range of +40° F. to −40° F. and is generally cooled to within the range of +35° F. to −20° F. for most common industrial solvents. Indeed, with common water miscible solvents it may be advantageous to cool to temperatures of 0° F. or less at some point during the recovery cycle in order to deplete the vapor in the accumulator to a desirably low level. Such temperatures can be achieved without frost problems when using such solvents due to their ability to depress the freezing point of water.

The use of refrigeration condensation in the present invention offers several advantages over the use of conventional water cooled condensers in combination with gas desorption of carbon beds. Refrigeration condensation allows more complete removal of condensable vapor from the carrier gas stream which in turn allows more complete removal of solvent from the accumulator. This reduction in the residual amount of solvent (solvent "heel") in the accumulator in effect increases the working capacity of the accumulator. This would allow the use of smaller accumulators and require less frequent accumulate/discharge cycling with a given size of accumulator. This becomes important from an energy use standpoint since during each discharge cycle the accumulator must generally be heated. The heating of a large carbon bed can consume a significant amount of the energy required in the recovery process and, thus, minimizing the number of heating cycles can be meaningful.

The ability to reduce the solvent heel also reduces cross contamination problems when the vapor in the vapor source is changed. For example, when a drying oven is used to dry different solvent-containing articles.

The present invention may also incorporate a number of preferred features which improve performance over the prior art systems. In one embodiment, the recirculating carrier gas stream is used to heat (and cool) a carbon bed. In another embodiment, only a portion of the recirculating carrier gas stream is taken as a side stream to be cooled for condensation and separation of the solvent. This provides increased efficiency and economical sizing of cooling components. In yet another embodiment, the side stream entering the condensing means is directed into heat exchange relationship with the gas stream leaving the condensing means. Thus, the gas entering the condensing system is pre-cooled while the gas leaving the condensing system is pre-heated before being returned to the carrier gas stream recirculating through the carbon bed. This recuperative heat exchange feature is particularly useful to provide improved efficiencies and economical operation.

More specifically, the method of the present invention may comprise passing a first condensable vapor-containing gas stream through a vapor accumulator, such as a packed carbon bed, to accumulate the vapor in the bed. Following accumulation of vapor in the bed, the vapor is released and carried from the bed by circulating a second carrier gas stream through the bed. The bed is heated, preferably by the second gas stream, to cause release, e.g., desorption, and admixture of the vapor in the carrier gas passing through the bed. Due to the use of the concentrating system, the average concentration of vapor in the desorption stream can be made much higher than the average concentration generally found in the first gas stream. This concentrated vapor-containing carrier gas stream can then be more efficiently and conveniently refrigerated to condense and recover the vapor therein.

As noted, the recovery of the vapor is accomplished in the present invention by directing at least a portion of the vapor-containing carrier gas stream through a refrigeration condensing system. Typically all or a portion of the vapor-containing inert gas stream is directed through a refrigeration condensing means, such as an open cycle or a closed cycle refrigeration system, to cool the side stream and cause the vapor to condense so that it can be separated and removed from the stream. Preferably the condensate is recovered for reuse. The cooled gas stream is then returned to the accumulating device and the recirculation of the gas through the accumulating device and condensing system continued until the vapor in the accumulating device is depleted to the desired level.

As can be appreciated by one skilled in the art, additional accumulating devices may be employed in parallel to the first device so that while one device is in the accumulating mode one or more of the others can be in the discharge mode to allow use in a continuous process.

The term "condensable vapor" as used herein, refers to materials which are normally liquid at room temperature, that is those materials which can be vaporized at temperatures normally encountered in industrial drying conditions, e.g. 20° C. to 200° C. whether at a standard or reduced pressure, but which can exist as a liquid at temperatures at or near room temperature and at pressures at or near atmospheric pressure. The term "condensable vapor" thus includes the commonly used industrial solvents which are used in coating resin formulations, degreasing, painting, printing, and the like and which can be flashed or vaporized in conventional industrial drying ovens.

The method and apparatus described herein have particular utility in combination with a drying oven to recover solvents removed by drying solvent-containing articles.

DETAILED DESCRIPTION

The use of refrigeration condensing means to separate and recover condensable vapor directly from a gas has been described in copending application Ser. No. 960,774, filed Nov. 15, 1978. However, due to the principle of operation of this system, the condensation of condensable vapor from gas streams containing relatively low concentrations of vapor or containing vapor having a high vapor pressure necessitates cooling the gas to relatively low temperatures to achieve condensation. Obtaining these low temperatures may be difficult and expensive and is accompanied by a number of problems including frost formation in the event of moisture being present in the gas stream.

A means of avoiding some of the problems associated with low temperature operation is to ensure that the vapor concentration in the gas stream is as high as possible. Unfortunately this is not always practical in an industrial environment. Due to the nature of many industrial processes, e.g., solvent removal in a drying oven, the vapor concentration will inherently be low due to the flow rate of the drying gas, the minimal residence time of the solvent-containing article in the oven, and primarily, the need to maintain low solvent concentrations in air streams in order to avoid exceeding some safe fraction of the lower explosive limit (LEL) of the vapor/gas combination.

The safety problem can in some few cases be avoided by using non-flammable solvents. Where flammable solvents must be used, an "inert" gas can be used so that higher concentrations of solvent vapor can be safely employed. An inert gas is a gas which will not form combustible mixtures with the vapor, e.g., a gas containing less than 11% oxygen, by volume, such a gas being pure nitrogen or a mixture of nitrogen and oxygen. The use of inert gas for drying is shown in the literature, for example in U.S. Pat. No. 4,150,494. However, this practice requires tightly sealed processing equipment, e.g., drying ovens, and modification of existing equipment to use inert gas may entail significant expense.

It has now been found that the condensation technique can be effectively employed in combination with industrial processes where relatively low vapor concentrations are encountered if, instead of attempting to condense the process gas directly, the process gas is first operated on by a concentrating system to remove the vapor from the process gas and store or accumulate the vapor. This vapor can then be removed from the accumulator by a carrier gas stream which can be made to have a higher concentration of the vapor than the process gas from which the vapor originally came. This concentrated gas stream can then be advantageously condensed by the refrigeration condensation techniques to be described herein at acceptable levels of efficiency and at temperatures or under conditions which promote rapid and complete condensation, but which avoid the frost problems which would otherwise be encountered in a direct condensation process. Thus, by employing a unique variety and arrangement of concentrating and condensing apparatus a particularly efficient indirect condensation system and process has been developed.

Figure 1:
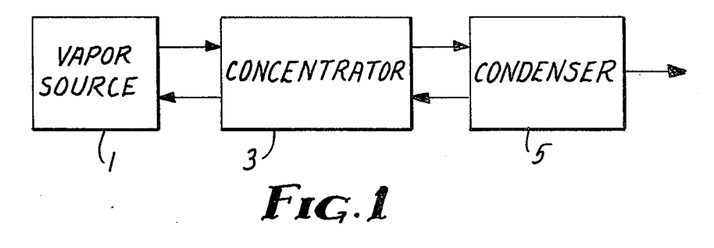
FIG. 1 is a simplified block diagram of a vapor recovery system.

The indirect condensation technique as employed in the present invention has been represented in FIG. 1 of the drawing where there is a block diagram showing a vapor source 1 a concentrator 3 and a refrigeration condensing system 5.

The vapor source 1 can be any source of gas containing a condensable vapor. For the sake of simplicity and practicality specific reference will be made throughout this specification to solvent vapors and the vapor source discussed by way of illustration will be an industrial drying oven. A typical industrial drying oven consists of a tunnel of appropriate length through which solvent-containing articles may pass. A gas stream is typically passed through the tunnel, in a co-current, cross-current or countercurrent fashion, generally at elevated temperature to mix with the solvent released from the articles and carry the solvent from the oven.

Although the gas drying oven is discussed herein as a representative vapor source it will be appreciated that the system and method described herein may be used to advantage with other processes where solvents or condensable vapors are encountered such as in connection with dry cleaning processes, paint spraying booths, parts degreasing and cleaning, polymer processing, printing or other situations in which large quantities of such vaporizable liquids are transferred, transported or stored.

The concentrator system 3 represented in FIG. 1 includes an accumulating device which can be any device which will effectively remove condensable vapor from the condensable vapor-containing gas available from the vapor source 1 and store or accumulate it for further processing. Representative accumulating devices which are readily available are devices containing activated carbon which will adsorb most of the common solvent and other condensable vapors from a gas stream passed therethrough. Fixed and moving bed devices are preferred over fluidized bed devices for use in the present invention. Fixed bed devices are generally less expensive, can accommodate a wider range of flow rates, can be cycled from the adsorb to desorb mode more quickly, require less expensive adsorbents and the like. Fluidized beds are less preferred due to more restrictive flow rate ranges and the expense of the adsorbent material employed. Although activated carbon is the preferred adsorbent, other adsorbent materials such as molecular sieves etc. may be useful in certain applications.

As noted above, the concentrator system 3 may comprise a single fixed bed which is alternately adsorbed and desorbed. The concentrator may also comprise plural beds so that one bed is always available for adsorption to allow continuous operation. Alternatively, moving bed devices, such as rotating or conveyor beds may be employed whereby the adsorbent medium is continuously moved through adsorbing and desorbing areas which are sealed from one another, again allowing continuous operation.

The refrigeration condenser system 5 represented in FIG. 1 can be any means for refrigerating and condensing at least a portion of the vapor in the condensable vaporcontaining carrier gas stream employed to carry the vapor from the accumulator. Mechanical refrigeration systems such as open cycle heat pumps and closed cycle refrigeration systems can be employed to advantage and will be described in greater detail hereinafter. Other means of refrigeration such as liquified gasses, freezing point depressants etc. can be used, but are less preferred. The condensed material can be recovered as a liquid from the condenser.

The flow represented by the arrows in FIG. 1 show circulation of the gas from vapor source 1 to concentrator and back again and also from concentrator 3 to condenser and back again. In practice, the gas taken from vapor source 1 may be partially or totally exhausted from concentrator 3 without being returned to the vapor source 1. Similarly some or all of the gas entering condenser 5 may be exhausted after being processed or may be returned to an adsorbing concentrator as will be described in greater detail in connection with the other Figures.

Figure 2:
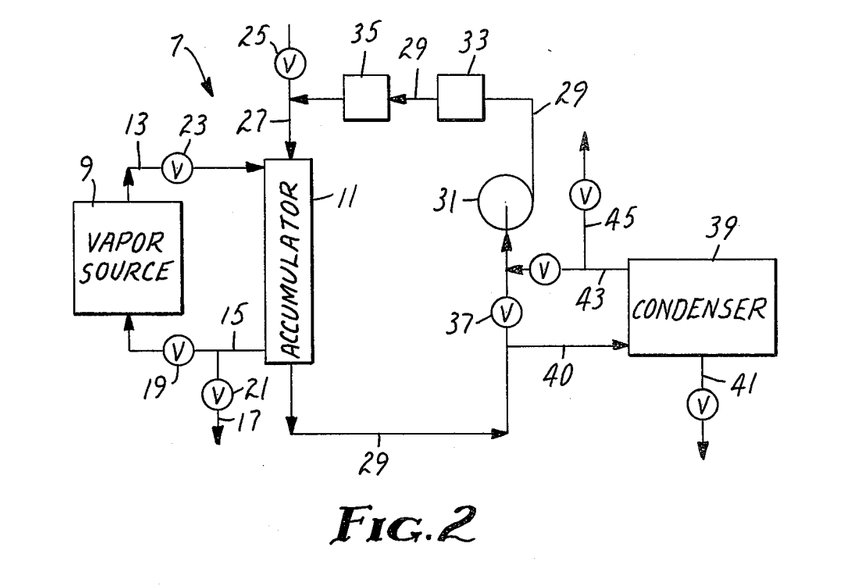
FIG. 2 is a schematic diagram of a basic vapor recovery apparatus employing a carbon bed and refrigeration condensing apparatus.

Referring to FIG. 2 there is shown a processing system 7 comprising a vapor source 9, such as a drying oven. Vapor source 9 is connected to an accumulator such as carbon bed 11 by lines 13 and 15. In the adsorb mode the condensable vapor-containing gas enters bed 11 through line 13 and is adsorbed on the carbon in bed 11. The stripped gas exits bed 11 through line 15 and is either recirculated to the vapor source 9 or exhausted through line 17 by the selective opening and closing of valves 19 and 21.

When the amount of vapor has reached the desired upper limit or capacity of carbon bed 11 vapor source 9 is shut off or connected to a second accumulator (not shown) by manipulation of valves 19 and 23.

The carbon bed 11 can then be desorbed by circulating a noncondensable carrier gas through the carbon bed 11. When flammable solvent is being recovered, an inert carrier gas is initially supplied through valve 25 and line 27 to purge the system and reduce the oxygen content to a non-combustible level. The carrier gas flows through bed 11 exiting the carbon bed through line 29 which is a recirculation path back to the bed 11.

Blower 31 provides the pressure to cause the flow through the lines. Heater 33 and cooler 35 are employed, respectively, to heat the carrier gas stream during the desorb mode and to cool the gas stream following completion of desorption. Heater 33 may be any conventional means used to heat a gas stream such as a steam coil, electrical resistance heater, gas fired heater or the like. Similarly, cooler 35 may be a cold water heat exchanger, refrigeration coil or the like.

In the desorption mode, the carbon bed 11 is heated, such as by internal heating coils or by heating the carrier gas circulating through lines 27 and 29 by heater 33. Heating of the gas is generally preferred since the carbon bed 11 is more uniformly heated and can be more completely desorbed at generally lower maximum bed temperatures. That is, there are no concentrated hot spots in the bed resulting in an inefficient use of energy. The temperature to which the bed 11 must be heated will, of course, vary with the vapor adsorbed therein.

As desorption of the bed occurs, the concentration of vapor in the carrier gas stream in line 29 increases. By regulation of valve 37 some or all of the circulating gas is directed into the refrigeration condenser system 39 through line 40 where the gas is cooled, optionally under pressure of up to about 3 atmospheres, to cause condensation of at least a portion of the condensable vapor. The condensing system 39 can be an open cycle refrigeration system or a closed cycle refrigeration system capable of refrigerating the vapor-containing carrier gas to the point where condensation of the vapor will occur. These refrigeration systems will be described in greater detail hereinafter in connection with FIGS. 3 and 4.

The condensate can be removed through drain line 41 while the carrier gas which has been processed in the condensing system 39 is returned to the desorbing gas stream through lines 43 and 29 or alternatively exhausted through line 45 or returned to a carbon bed in the adsorbing mode not shown.

As noted previously, the noncondensable gas used to desorb the concentrator can be an inert gas to allow high concentrations of flammable vapors to be fed to the condensing system. Air may be used where the vapor does not form an explosive mixture with the gas in the concentrations to be employed.

Figure 3:
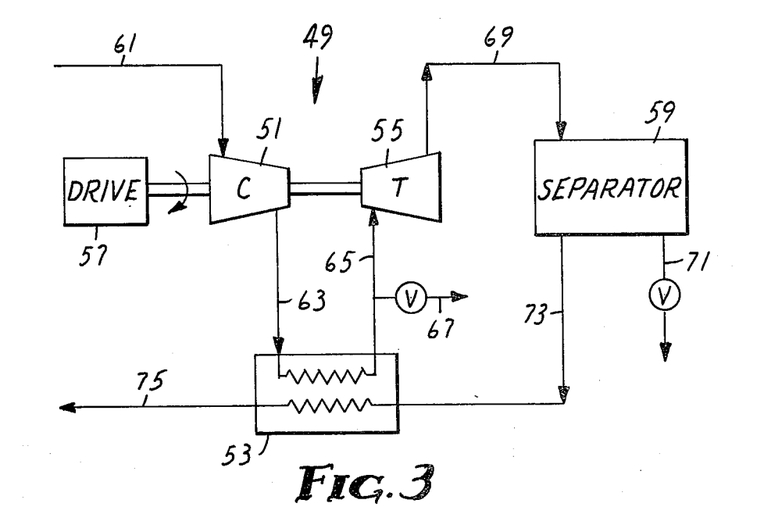
FIG. 3 is a schematic diagram of an open cycle refrigeration condensing apparatus.
Figure 4:
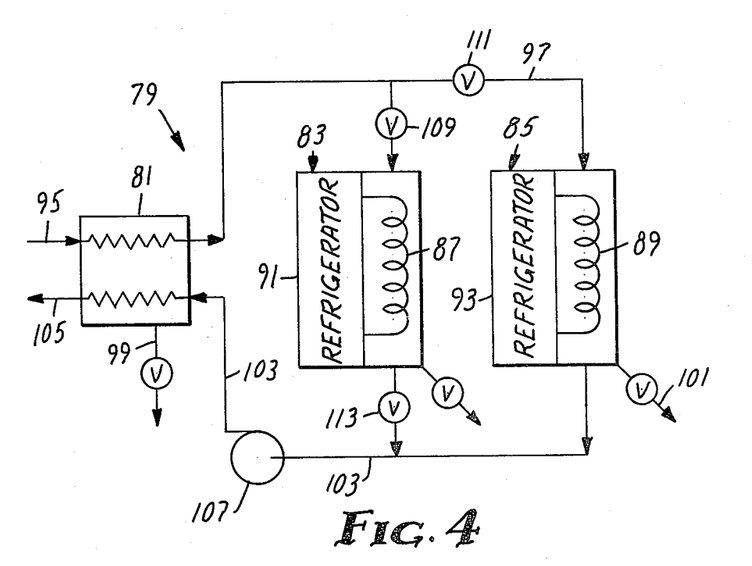
FIG. 4 is a schematic diagram of a condensing apparatus comprising a closed cycle refrigeration system for cooling.

FIGS. 3 and 4 show two different refrigeration condensing systems which can be employed in the present invention. FIG. 3 depicts an open cycle refrigeration condensing system shown generally at 49 which could be used as the condensing system 39 shown in FIG. 2. The open cycle system is disclosed in copending application Ser. No. 960,774, filed Nov. 15, 1978, which disclosure is incorporated by reference. Condensing system 49 comprises a compressor 51, heat exchanger 53, turbine or expander 55 and drive means 57, such as an electric motor, for the compressor 51. In the most advantageous arrangement, the compressor 51, and the turbine 55 are coupled together in such a manner that the work produced by the turbine 55 is utilized to help drive the compressor 51, thus reducing the load on the drive motor and improving the overall efficiency of the system. Condensate separator 59 completes the system along with associated valves and lines.

In operation, the vapor-containing carrier gas enters the condensing system 49 through inlet line 61 at temperature $T_1$ and pressure $P_1$ and is compressed by compressor 51 to $T_2$ and $P_2$ where the ratio of $P_2/P_1$ is generally about 1.3:1 to 3:1.

Depending on the pressure ratio of the compressor and the initial temperature, the gas may leave the compressor at about 150° C. After leaving compressor 51, the gas passes through line 63, heat exchanger 53 and line 65, on its way to expander 55.

The precooled gas from heat exchanger 53 enters expander 55 where it expands back to nominal atmospheric pressure becoming cooled in the process. The work produced during expansion is used to help drive compressor 51, thus reducing the load on drive motor 57.

Depending upon the vapor component, the concentration of vapors, the pressure and temperature, some vapors may condense in heat exchanger 53 enroute to expander 55. A drain line 67 is provided to remove and collect any liquid that may condense. Additional vapor may condense on cooling during passage through expander 55 and exit line 69. This condensate is captured and collected by means of a condensate separator 59 and may be drained through drain line 71. The cooled carrier gas with much of the vapor condensed and removed, exits the separator through line 73 and exits the condensing system 49 via heat exchanger 53 and line 75. Heat exchanger 53 thus performs the dual function of precooling the gas enroute to expander 55 and reheating the cooled gas from expander 55, returning through line 73, before exiting the condensing system 49.

The compressor 51 and expander 55 used in the present invention may be of any suitable type: reciprocating, vane, rotary screw, centrifugal, axial flow, or other type. High efficiency, e.g., about 70% or greater, is desirable in order to minimize the net drive power and to permit attainment of the low temperatures for solvent vapor condensation.

The pressure ratio of the compressor and expander is a design variable that can be selected to optimize any given application. The greater the pressure ratio the greater the temperature change through the compressor and expander, but also the greater the net power required to drive the system. Generally, a pressure ratio of up to about 4:1, with pressure ratios in the range of 1.3:1 to 3:1 being generally preferred, are the most advantageous. However, for some applications, for example, where very volatile vapors are to be condensed or other low temperature conditions must be obtained, a higher pressure ratio may be desirable. The compressor may be driven by an electric motor, gas turbine engine, steam turbine, or other suitable means.

The heat exchangers used in the open cycle system can be any conventional type such as co-current, countercurrent, crossflow, gas-gas, gas-liquid, etc. It is desirable that the heat exchanger have an efficiency of about 70% or greater in order to enhance the economics of the process. Further, since the open cycle system generally operates at relatively low pressure ratios, it is desirable that the pressure drop across the heat exchangers also be minimized to maintain efficiency. However, while the pressure drops must be minimized in a low pressure open cycle system, certain advantages also accrue in that the heat exchangers need not be hermetically sealed as with a closed cycle freon system and, due to the low pressures encountered, can be constructed of light duty economical materials.

Although a single heat exchanger is shown for purpose of illustration in FIG. 3, in practice, additional heat exchangers may be used before the compressor 51 or between the compressor 51 or expander 55 for example, to reject heat from the gas entering the heat exchanger 53 through line 63. This is because a phase change (condensation) may occur in the heat exchanger 53 with respect to at least some of the condensable vapor contained in the gas in line 63, while no phase change will occur in the cooling gas in line 73 since all condensed vapor has been removed therefrom in separator 59. Accordingly, the capacity of the gas in line 73 to accept heat in heat exchanger 53 may be limited to the acceptance of sensible heat up to a limit of temperature $T_2$. Any excess heat given off by the condensation of vapor entering in line 63 can be advantageously rejected to another sink to improve efficiency of the system. Generally, this can be readily accomplished by the use of an auxillary heat exchanger to extract heat from the gas entering in line 63 at some point intermediate heat exchanger 53. This configuration takes advantage of the maximum temperature differences at each end of the exchanger in a counter current mode in order to obtain maximum heat transfer.

In certain applications, it may be desirable to utilize additional air or water cooled heat exchangers in line 65 prior to expander 55 to provide additional precooling of the gas prior to expansion.

When operating conditions in the system are such that ice may form, e.g., when operating for long periods below 0° C. with a solvent, such as heptane, which does not depress the freezing point of water, some means or technique may be necessary for preventing the formation of or for the removal of frost and ice from the separator 59, heat exchanger 53 or other parts of the system. This may be no more than a dual set of heat exchangers permitting defrosting of one set while the other is operating, or means, such as a molecular sieve, may be used to remove the moisture before it has a chance to collect on the component surfaces. Yet another technique is to inject a small quantity of alcohol, or other freezing point depressant, to depress the freezing point sufficiently to prevent frost or ice formation.

The separator, shown generally at 59 in FIG. 3, must perform the function of separating the condensed liquid droplets from the gas stream in which it is entrained. This may require a screen or packed column which provides a large surface area on which the condensed droplets can coalesce and drain away.

FIG. 4 is a simplified diagram of a condensing system employing closed cycle refrigeration. This condensing system is shown generally at 79 and comprises heat exchanger 81 dual condensers 83 and 85 containing cooling coils 87 and 89 through which the refrigerant flows. These coils 87 and 89 form part of a closed cycle refrigeration system represented by blocks 91 and 93. These closed cycle refrigeration systems may be of the conventional vapor compression type employing, for example, "Freon" as the refrigerant or they may be of some other closed cycle type of refrigeration system. The essential difference between the closed cycle condensing system 79 of FIG. 4 and the open cycle system 49 of FIG. 3 is in the method employed to cool the condensable vapor containing carrier gas entering the system. In the open cycle system 49 the gas is directly compressed and cooled without the use of a separate refrigerant. In the closed cycle system 79 of FIG. 4 a separate refrigerant is cooled and heat withdrawn from the vapor containing gas into the refrigerant which is maintained in a closed system separate from the vapor containing gas.

In operation the vapor-containing carrier gas taken from the accumulator is taken into condensing system 79 though line 95, passes through heat exchanger 81 where it is pre-cooled by the carrier gas stream which has been cooled by cooling coils 87 or 89. Some condensation may occur as a result of the cooling and the condensate may be drained from line 97 through drain line 99. The precooled gas is directed through line 97 into condenser 85 where it is cooled by cooling coil 89 causing condensation of vapor which may be drained through drain line 101. The cooled gas exits the condenser 85 into line 103 to be returned to heat exchanger 81 where it recovers heat from the gas entering in line 95 and exits through line 105. Blower 107 supplies the means to circulate the gas in the system in the event the pressure differential between lines 95 and 105 is not great enough.

A second condenser 83 is shown in parallel with condenser 85. This condenser can be used to cool a portion of the gas in line 97 to increase the capacity of the system by proper adjustment of valves 109, 111, and 113. This arrangement also allows the condensers 83 and 85 to be used consecutively. For example, in the event the first condenser must be defrosted the second condenser can be employed while the first is defrosted to allow continuous operation.

Figure 5:
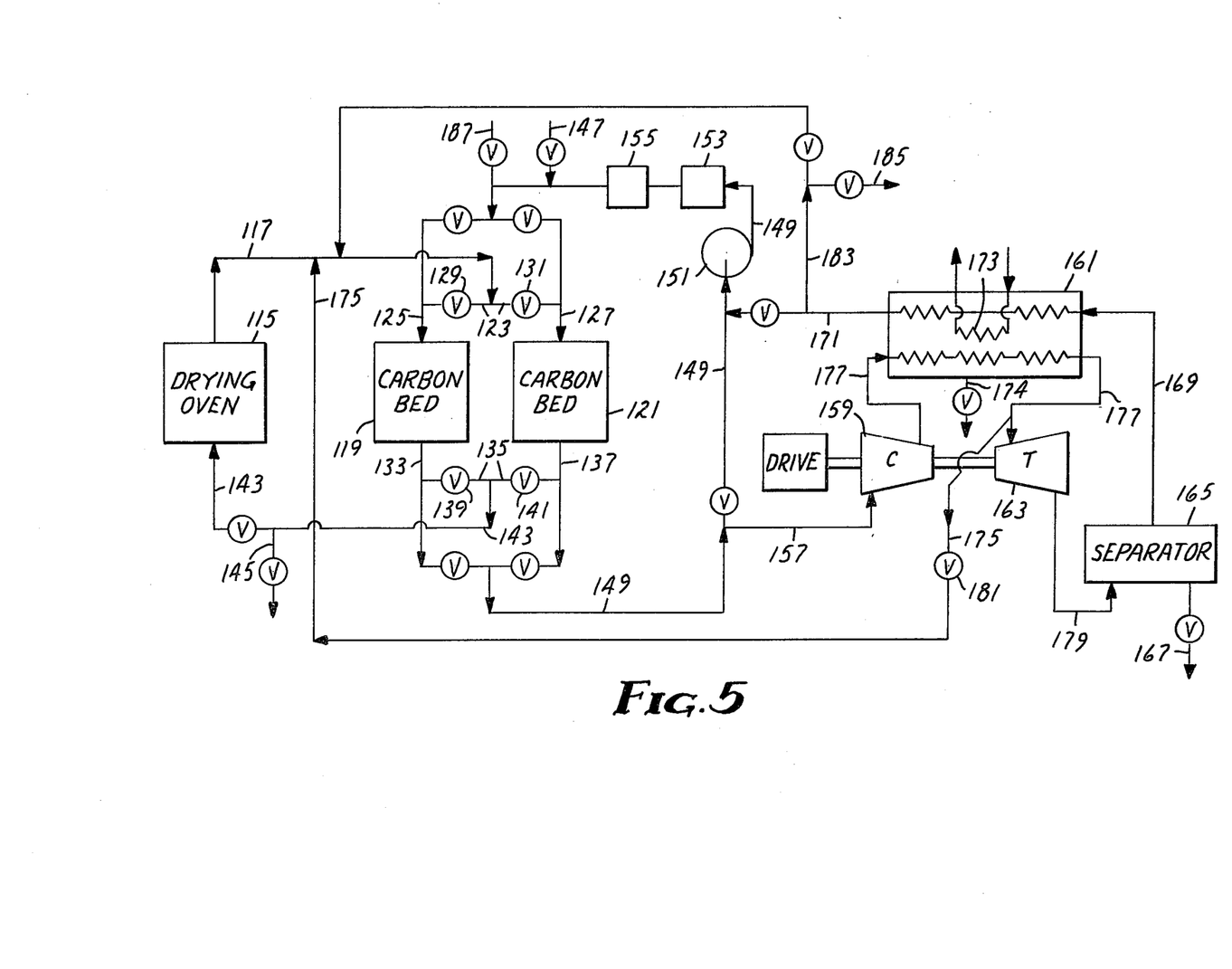
FIG. 5 is a schematic diagram of a vapor recovery system employing dual carbon beds and an open cycle refrigeration condensing system.

FIG. 5 is a schematic flow diagram of a drying oven system employing an indirect condensation system according to the present invention. The system comprises a drying oven 115 which is essentially a tunnel through which a solvent laden article (not shown) such as a coated web, or other coated article is passed through so that the solvent can be removed by contact with a gas stream which will take up and carry away at least a portion of the solvent. The drying process is generally continuous wherein the solvent-laden articles move co-, cross- or counter-current to the moving gas system.

The gas stream flowing through oven 115 exits through line 117 and is directed into either of carbon beds 119 or 121 through lines 123 and 125 or lines 123 and 127 by appropriate manipulation of valves 129 and 131. It is generally advantageous to have the gas stream enter the top of a vertical bed so that if fouling of the bed occurs, removal of the fouled carbon can be most readily accomplished. The vapors are adsorbed in the carbon beds 119, 121 and the process gas stream leaves the beds through lines 133 and 135 or lines 137 and 135 (depending on which bed 119 or 121 is in the adsorb mode) by manipulation of valves 139 and 141. The clean gas can then be recirculated to oven 115 through line 143 or exhausted through line 145.

As has been noted, two carbon beds 119 and 121 are employed in the system shown in FIG. 5. This allows one of the beds to be desorbed while one is adsorbing which in turn allows drying oven 115 to operate continuously. Appropriate manipulation of valves 129, 131, 139 and 141 allows switching from one bed to the other.

Once bed 119 has adsorbed the desired amount of vapor or reached its capacity, closing valve 129 and 139 while opening valves 131 and 141 will divert the gas stream in line 117 to bed 121. Bed 119 can then be desorbed by a separate carrier gas stream. This carrier gas stream, preferably an inert gas stream, enters through line 147 and flows into recirculation loop 149 and into carbon bed 119 through line 125. During desorption, bed 119 is heated either by heating elements contained in the bed (not shown) or by heating the noncondensable carrier gas entering the bed. On heating the bed 119, the vapor is desorbed and admixed with the carrier gas stream and swept from the bed through lines 133 and 149. The desorption stream is moved through the bed by blower 151 and can be heated and cooled by heater 153 or cooler 155.

As the vapor-containing carrier gas stream leaves bed 119 through line 149, at least a portion of the stream is directed into the refrigeration condensing system through line 157. The portion of the gas stream entering the condensing system is controlled by valve 159. The amount of gas diverted into the condensing system through line 157 is determined by a number of factors, but primarily by the size of the carbon beds 119 and 121 and the desired flow rate through the beds and the sizing of the condensing system. The desorption time (including heating and cooling times) of the beds 119 and 121 is determined in part by the flow rate of carrier gas through the beds. The selected flow rate may be too large to be accomodated by the available condensing system. Moreover, a condensing system large enough to handle all of the volume flowing through line 149 may not be cost justified in order to achieve incremental decreases in desorption time.

The vapor-containing gas entering the refrigeration condensing system is compressed by compressor 159, cooled in heat exchanger 161, expanded in turbine 163 to provide further cooling, and enters separator 165, where the condensed vapor is removed through drain line 167 as described in connection with FIG. 3. The cooled gas is exhausted from the separator through line 169 and is directed through heat exchanger 161 where it is pre-heated by the gas from compressor 159. The pre-heated gas is then returned to the desorption loop through line 171.

As shown in FIG. 5, heat exchanger 161 is adapted to allow additional cooling of the gas from compressor 159 by means of a cooling coil 173, generally cooled by water. Since some condensation may occur as a result of the cooling in heat exchanger 161, a drain line 174 is provided.

In the system shown in FIG. 5 an optional vent line 175 is shown which allows a reduction in the pressure of bed 119 or 121 as it is being desorbed. This occurs as a result of the pressure ratio across compressor 159 and turbine 163. For example, if the line pressure entering compressor 159 is 1 atmosphere and both the compressor 159 and turbine 163 are operating at 2:1 compression ratios, then the pressure in line 177 leaving compressor 159 will be 2 atmospheres. Similarly, the pressure in line 179 leaving turbine 163 will be 1 atmosphere. However, if valve 181 is opened to atmospheric pressure then the pressure in line 179 due to expansion in turbine 163 will be ½ atmosphere and the pressure in the carbon bed 119 will be brought below 1 atmosphere. This reduced pressure will reduce the residual vapor concentration in the bed. Of course, venting in this manner draws off some of the vapor-containing gas and routes it back to line 117 where it is fed to bed 121 in the adsorb mode. Thus, in effect, some vapor is merely transferred from one bed to the other and it may only be advantageous to employ the venting procedure near the end of the desorption cycle.

Once bed 119 has been desorbed to the desired level the hot bed must be cooled in order to be ready to enter the adsorb mode again. This is accomplished in part by the use of cooler 155 to cool the recirculating gas in loop 149. As the cooling of the bed 119 continues and the vapor level in the bed 119 has dropped below the residual level no more solvent will appear in the carrier gas in line 171 and the output can be exhausted through lines 183 and 185 with relatively cool ambient air being brought in through line 187 during the final cooling stage if desired. Routing the output in line 171 through line 183 and back to an adsorbing carbon bed through line 117 may also be desirable when the concentrating circuit is first purged with gas prior to beginning desorption.

Typical operating conditions for a system similar to that shown in FIG. 5 can be predicted under the following conditions:

Solvent Laden Air Stream from Oven 10,000 CFM — 30% L.E.L. at 90° F.
Solvent — 70% Heptane, 30% Isopropanol
Approx. 500 pounds solvent per hour Carbon Beds 9300 lbs. carbon each bed, 11% working charge (by weight) of solvent Condensing System 2000 CFM open cycle heat pump
90 hp drive The carbon bed would require about 120 min. to adsorb the specified charge of solvent.

To desorb the solvent-charged bed, nitrogen gas circulated by a 50 hp blower (151) at the rate of 10,000 C.F.M. will heat the bed to 300°-350° F. 2000 C.F.M. would be taken as a side stream and routed through the refrigeration condensing system. During desorption the average vapor concentration would be about 3.5% by volume with a peak concentration of about 7% by volume. The turbine exhaust temperature in line 179 will vary from about +40° F. at the beginning of desorption and falling to about −40° F. at the end of the desorption cycle when the vapor concentration is lowest. The working charge (approximately 1000 pounds) of solvent will be desorbed in about 76 minutes requiring about 1900 BTU of energy per pound of solvent recovered.

The bed can be adequately cooled in about 28 minutes by cooling the top half of the bed with nitrogen at 100° F. flowing co-current to the direction of adsorption flow. The lower half of the bed will then be cooled by the gas flowing through during the adsorption cycle.

The performance of the indirect condensation system of the present invention has been confirmed in a pilot system similar to that shown in FIG. 2. A carbon bed containing 1135 grams of carbon with a bed depth of 18 inches was used to adsorb the vapor from an air stream flowing at the rate of 225 scfh. The air stream was at 90° F. and 50% relative humidity and contained 3800 ppm mixture of isopropanol (30 wt. %) and a heptane fraction (70 wt. %). The adsorb cycle was continued for about 108 minutes at which time the concentration of vapor in the air stream leaving the bed was 380 ppm (10% of entering concentration).

The charged bed was then desorbed using nitrogen gas heated to 356° F. and circulated at the rate of 139 scfh. A refrigerated condensing system was used to cool the desorption gas stream to −29° F. After circulating the gas stream through the condenser for about 90 minutes 104 grams of heptane, 45 grams of isopropanol and 14 grams of water was condensed and recovered. This represented about 98% of the solvent initially charged to the bed. Cooling the bed by recirculating the gas without heating required about 30 minutes, suggesting that substantially complete desorption and cooling could be accomplished in an amount of time substantially equivalent to the adsorb time.

What is claimed is:

1. A method of recovering condensable vapor contained in a gas stream, said method consisting essentially of
   (a) introducing said gas stream into a concentrating means comprising a fixed or moving bed accumulating means wherein said vapor is separated from said gas and temporarily retained.
   (b) admixing at least a portion of the vapor retained in said accumulating means with a second noncondensable carrier gas whereby the average concentration of condensable vapor in said carrier gas is greater tuan the average concentration of condensable vapor in said first gaseous medium, and
   (c) refrigerating only a portion of said vapor-containing carrier gas to cause condensation of at least a portion of said condensable vapor therein and recovering said condensate.

2. A method according to claim 1 wherein said accumulating means is an adsorption bed.

3. A method according to claim 1 wherein said portion of said vapor-containing carrier gas is refrigerated to a temperature of 35° F. or lower.

4. A method for removing condensable, non-aqueous vapor from a first gas stream consisting essentially of
   (a) passing said gas stream through an accumulating means comprising a fixed or moving carbon bed to adsorb said condensable vapor in said carbon bed,
   (b) desorbing said condensable vapor from said carbon by circulating a second noncondensable carrier gas through said bed, said carbon bed being heated to a temperature sufficient to cause desorption and admixing of said condensable vapor in said carrier gas,
   (c) direcitng at least a portion of said second, circulating, vapor-containing carrier gas stream exiting said carbon bed through a refrigeration condensing means to refrigerate said carrier gas stream and cause condensation of at least a portion of said condensable vapor contained therein and removing condensate from said condensing means.

5. A method according to claim 4 wherein said carrier gas stream is an inert gas stream.

6. A method according to claim 4 wherein said refrigeration condensing means includes a heat exchanger arranged to transfer heat from the gas stream entering said condensing means to the gas stream leaving said condensing means.

7. A method according to claim 4 wherein said carbon bed is heated by said carrier gas stream.

8. A method according to claim 4 wherein said circulating carrier gas stream cools said bed following the desorption cycle.

9. A method according to claim 4 wherein said condensing means comprises an open cycle heat pump.

10. A method according to claim 4 wherein said condensing means comprises a closed cycle regrigeration system.

11. A method according to claim 4 wherein said portion of said second, circulating, vapor-containing carrier gas is refrigerated to a temperature of 35° F. or lower.

12. A method acording to claim 4 wherein at least a portion of the second, non-condensable carrier gas is exhausted following refrigeration.

13. Apparatus for removing condensable, non-aqueous vapor from a gas stream consisting essentially of
    (a) a fixed or moving carbon bed arranged to adsorb condensable vapor from a first entering gas stream,
    (b) means for circulating a second stream of noncondensable carrier gas, which may optionally be heated, through said carbon bed to desorb vapor from said carbon bed, and
    (c) a refrigeration condensing means arranged to refrigerate at least a portion of said carrier gas and condense and separate at least a portion of said vapor in said carrier gas.

14. Apparatus according to claim 13 including means for heating said carrier gas stream entering said carbon bed.

15. Apparatus according to claim 13 including heat exchange means arranged so that said carrier gas stream entering said condensing means is caused to transfer heat to said carrier gas stream leaving said condensing means.

16. Apparatus according to claim 13 wherein said condensing means comprises an open cycle heat pump system arranged to cool said portion of carrier gas stream and cause condensation and separation of said condensable vapor.

17. Apparatus according to claim 13 wherein said condensing means comprises a refrigeration coil which is part of a closed cycle refrigeration system.

18. Apparatus according to claim 13 wherein said first vapor-containing gas stream entering said carbon bed is taken from a drying oven.

19. Apparatus according to claim 13 including means for cooling said second gas stream entering said carbon bed.

20. Apparatus according to claim 13 further including a gas drying oven in combination therewith and arranged to present a gas stream containing condensable vapor to said apparatus.

21. An apparatus according to claim 13 wherein said refrigeration condensing means cools said carrier gas to a temperature of 35° F. or less.

22. A method of recovering condensable, non-aqueous vapor contained in a gas stream, said method consisting essentially of
    (a) introducing said gas stream into a concentrating means comprising a fixed or moving bed accumulating means wherein said vapor is separated from said gas and temporaily retained.
    (b) admixing at least a portion of the vapor retained in said accumulating means with a second noncondensable carrier gas whereby the average concentration of condensable vapor in said carrier gas is greater than the average concentration of condensable vapor in said first gaseous medium,
    (c) removing moisture from at least a portion of said vapor-containing carrier gas and refrigerating only a portion of said vapor-containing carrier gas to cause condensation of at least a portion of said condensable vapor therein and recovering said condensate.

23. A method for removing condensable, non-aqueous vapor from a first gas stream consisting essentially of
    (a) passing said gas stream through an accumulating means comprising a fixed or moving carbon bed to adsorb said condensable vapor in said carbon bed,
    (b) desorbing said condensable vapor from said carbon by circulating a second noncondensable carrier gas through said bed, said carbon bed being heated to a temperature sufficient to cause desorption and admixing of said condensable vapor in said carrier gas, (c) removing moisture from at least a portion of said second, circulating, vapor-containing carrier gas, and directing the dried gas through a refrigeration condensing means to refrigerate said carrier gas stream and cause condensation of at least a portion of said condensable vapor contained therein and removing condensate from said condensing means.

24. Apparatus for removing condensable, non-aqueous vapor from a gas stream consisting essentially of (a) a fixed or moving carbon bed arranged to adsorb condensable vapor from a first entering gas stream, (b) means for circulating a second stream of noncondensable carrier gas, which may optionally be heated, through said carbon bed to desorb vapor from said carbon bed, (c) means for removing moisture from at least a portion of said carrier gas, and (d) refrigeration condensing means arranged to refrigerate at least a portion of said carrier gas and condense and separate at least a portion of said vapor in said carrier gas.

25. A method of recovering condensable, non-aqueous vapor contained in a gas stream, said method consisting essentially of (a) introducing said gas stream into a concentrating means comprising a fixed or moving bed accumulating means wherein said vapor is separated from said gas and temporarily retained.

(b) admixing at least a portion of the vapor retained in said accumulating means with a second noncondensable carrier gas whereby the average concentration of condensable vapor in said carrier gas is greater than the average concentration of condensable vapor in said first gaseous medium, (c) refrigerating at least a portion of said vapor-containing carrier gas to cause condensation of at least a portion of said condensable vapor therein and recovering said condensate.

* * * * *